No. 724,782. PATENTED APR. 7, 1903.
G. BECKER.
ADJUSTABLE MIRROR HOLDER.
APPLICATION FILED JUNE 19, 1902.
NO MODEL.
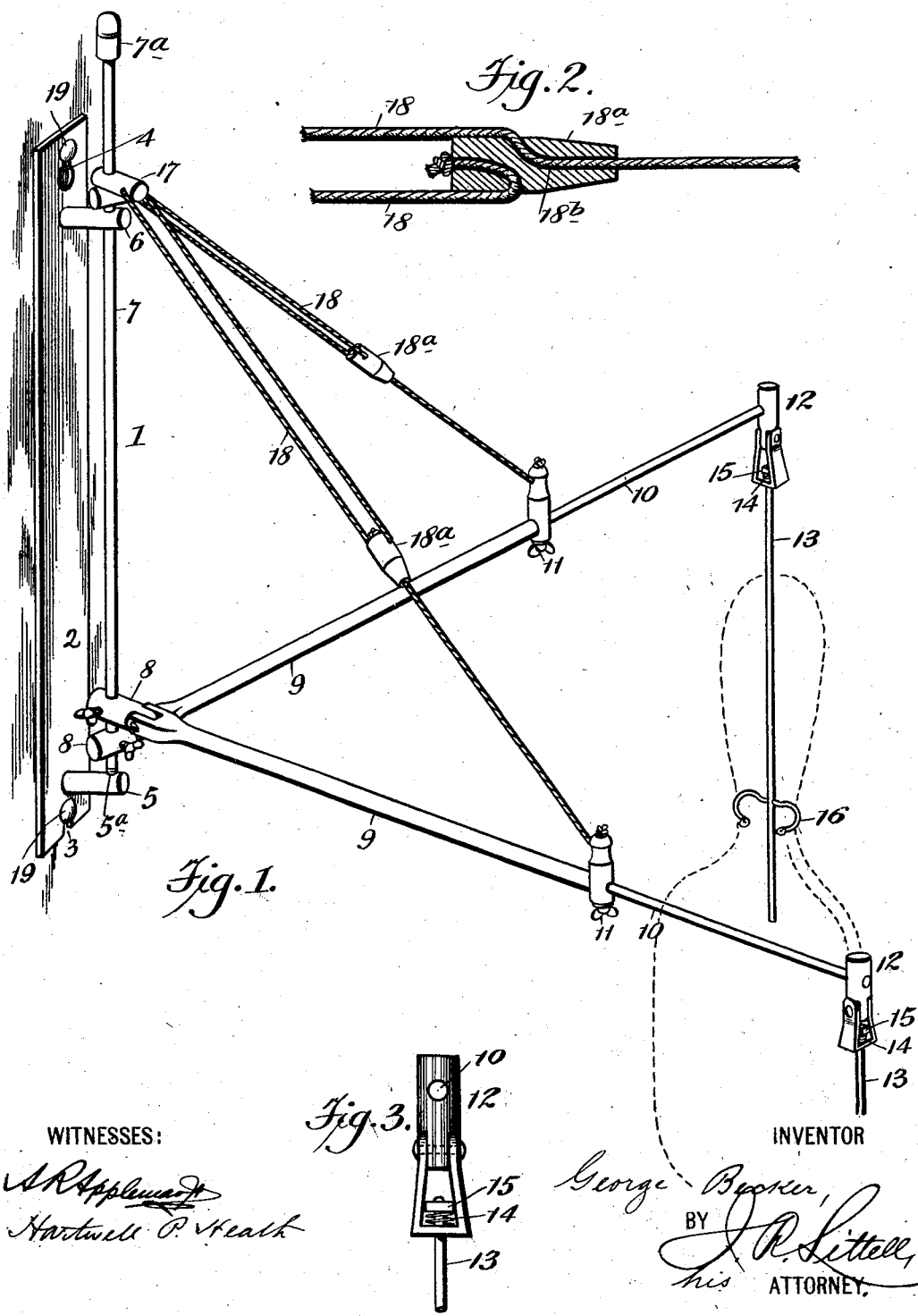
WITNESSES: INVENTOR
George Becker,
BY
his ATTORNEY.

UNITED STATES PATENT OFFICE.

GEORGE BECKER, OF NEW YORK, N. Y.

ADJUSTABLE MIRROR-HOLDER.

SPECIFICATION forming part of Letters Patent No. 724,782, dated April 7, 1903.

Application filed June 19, 1902. Serial No. 112,267. (No model.)

*To all whom it may concern:*

Be it known that I, GEORGE BECKER, a citizen of the United States, residing at New York, in the county and State of New York, have invented certain new and useful Improvements in Adjustable Mirror-Holders, of which the following is a specification.

This invention relates to adjustable mirror-holders, and has for its object to provide a device of the class described which will possess points of advantage in convenience, simplicity, inexpensiveness, effectiveness, and general efficiency.

The invention further provides a device of the class described which may be detachably connected with a support and which when not in use may be folded into small compass for carriage or storage, and also includes a novel arrangement which will enable the user not only to adjust one of the mirrors at predetermined heights or angles with regard to a supplementary mirror, such as is found in connection with most dressing-tables, but affords a ready and convenient instrumentality for bringing a third mirror into use.

The improvements further embody instrumentalities whereby the mirror-supporting parts may be readily adjusted so as to move the mirrors in different directions with regard to each other and to the main support, all of which will be hereinafter particularly described.

In the drawings, Figure 1 is a perspective view of a mirror-holder embodying my improvements attached to a support. Fig. 2 is a detail sectional view of one of the slides and adjoining parts, partly broken away. Fig. 3 is an enlarged detail view of one of the parts.

Corresponding parts in all the figures are denoted by the same reference characters.

Referring to the drawings, 1 designates a bracket provided with a flat base 2, in the lower end of which a recess 3 is formed, and near the upper part of which a slot 4, provided with an enlarged circular lower part, is formed in the base 2. Projecting from the base 2 are two studs, the lower, 5, of which is provided with a screw-threaded vertical socket $5^a$, and the upper, 6, of which has an opening in vertical alinement with said socket. A rod 7, having its lower end screw-threaded complementary to the socket, passes through the opening in the upper stud 6 and is threaded into the socket $5^a$. The rod 7 has its upper end screw-threaded and provided with a cap $7^a$. Slidably mounted on the rod 7, between the studs 5 and 6, are two carriers 8. Pivotally mounted on the carriers 8 for vertical movement are two hollow arms 9. Slidably mounted in the arms 9 are arms 10, which are adapted to be held in predetermined positions by thumb-screws 11. The arms 10 are provided at their outer ends with suitable hangers 12, which in the form here shown comprise a body member secured upon the end of the rod 10 and a stirrup depending from such body member. The upper end of a rod 13 extends through an aperture in the bottom of the stirrup and is provided with a coiled spring 14, above which a nut 15 is secured upon the rod 13. At a suitable distance from its lower end the rod 13 is provided with a loop 16, extending at right angles to the rod 13 and formed of any suitable material (here shown as a wire) soldered to the rod 13 and projecting from each side of said rod, the ends being turned back upon themselves, so as to leave a small opening in the front of the loop 16. Slidably mounted upon the rod 7, above the stud 6, are pulleys 17, which are connected with the outer ends of the arms 9 by suitable flexible members, herein shown as cords 18. Preferably the cords are provided with means of regulating their length, so as to hold the arms 9 at the desired angle, which means are here shown as slides $18^a$, in which one end of the cord 18 is secured and through the tortuous opening $18^b$ in which the other member of the cord 18 slides.

In assembling the parts two headed pins 19 are secured in a support at a suitable distance apart and the base 2 of the bracket 1 placed with the enlarged circular portion of the slot 4 over the head of the upper pin 19, the recess 3 above the shank of the lower pin 19, and the base 2 slid down, so that the upper pin 19 enters the smaller portion of the slot 4, while the lower pin enters the recess 3. The rod 7 having been passed through the opening in the stud 6, the carriers 8 are placed upon the lower end of the rod 7 and said lower end screwed into the socket $5^a$. The pulleys 17 are now placed over the upper part of the rod 7, above the stud 6, and the cap 7ª screwed upon the upper end of the rod 7. The cords 18 are now adjusted by means of slides 18ª, so that the arms 9 will be held at the desired angle. It is evident that by placing the handle of a hand-mirror in the loop 16 such mirror (shown in dotted lines in Fig. 1) may be adjusted at various angles and distances and at suitable heights.

By attaching the bracket 1 to the frame of the mirror over a dressing-table the making of the toilet is greatly facilitated, since the person may be able without moving materially to place one or both of the mirrors at any angle desired, so as to see the back or sides of the head or person, and both hands will be free to use in arranging and adjusting the toilet.

The operation and advantages of my invention will be readily understood and appreciated. The device may be quickly adapted to any suitable support, and with simply two hand-mirrors or with these in connection with a fixed looking-glass all the advantages of the trefoil folding mirror may be had. The device will be especially useful in dressing-rooms at public halls or impromptu dressing-rooms at private entertainments.

I do not desire to be understood as limiting myself to the details of construction and arrangement as herein described and illustrated, as it is manifest that variations and modifications may be made in the features of construction and arrangement and in the adaptation of the device to various conditions of use without departing from the spirit and scope of my invention and improvements. I therefore reserve the right to all such variation and modification as properly fall within the scope of my invention and the terms of the following claim.

Having thus described my invention, I claim and desire to secure by Letters Patent—

A device of the class described, consisting of the following instrumentalities, viz: a bracket composed of a base-plate adapted for connection to a support and having two studs approximately at right angles to such base, and a rod fastened at one end to one of the studs and passing through and beyond the other stud, carriers slidably mounted upon the bracket-rod between the studs named, telescopic arms pivoted at their inner ends to said carriers, mirror supports and holders depending from outer ends of said arms, pulleys carried by the bracket-rod, and cords and slides whereby adjustable connection is had with the telescopic arms, all substantially as and for the purpose set forth.

In testimony whereof I have signed my name in the presence of the subscribing witnesses.

GEORGE BECKER.

Witnesses:
JOHN M. HOCTOR,
MARGARET M. DURKIN.